June 10, 1930. G. F. BEACH 1,763,385
VALVE APPARATUS
Filed Sept. 8, 1927 5 Sheets-Sheet 1

June 10, 1930.  G. F. BEACH  1,763,385
VALVE APPARATUS
Filed Sept. 8, 1927    5 Sheets-Sheet 2

Inventor:-
George F. Beach
by his Attorneys,
Howson & Howson

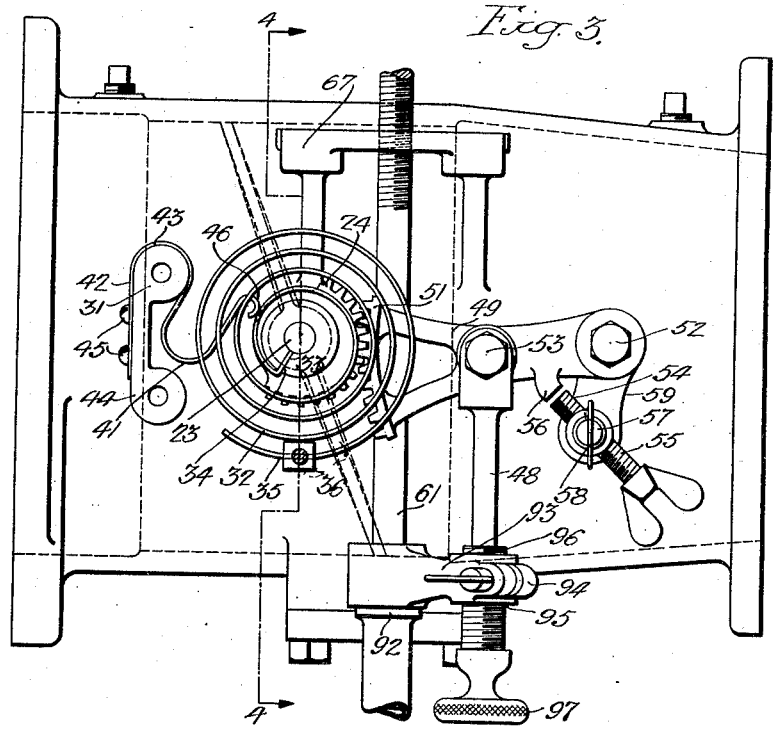

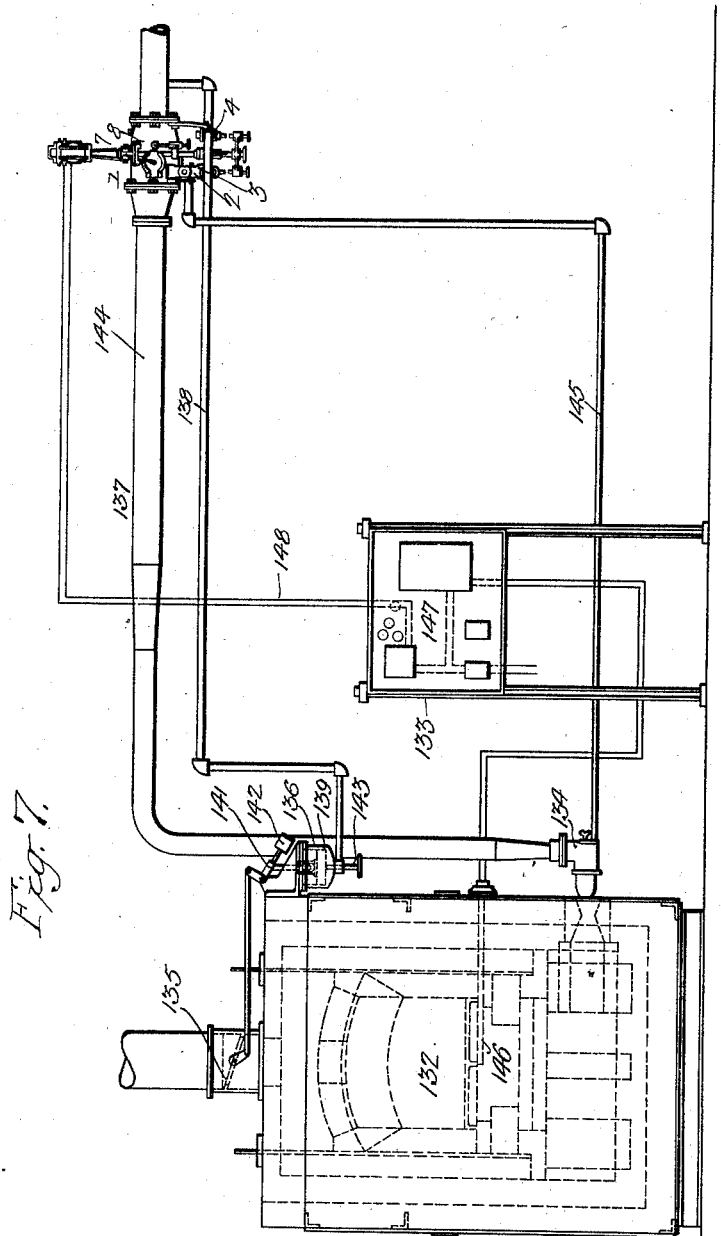

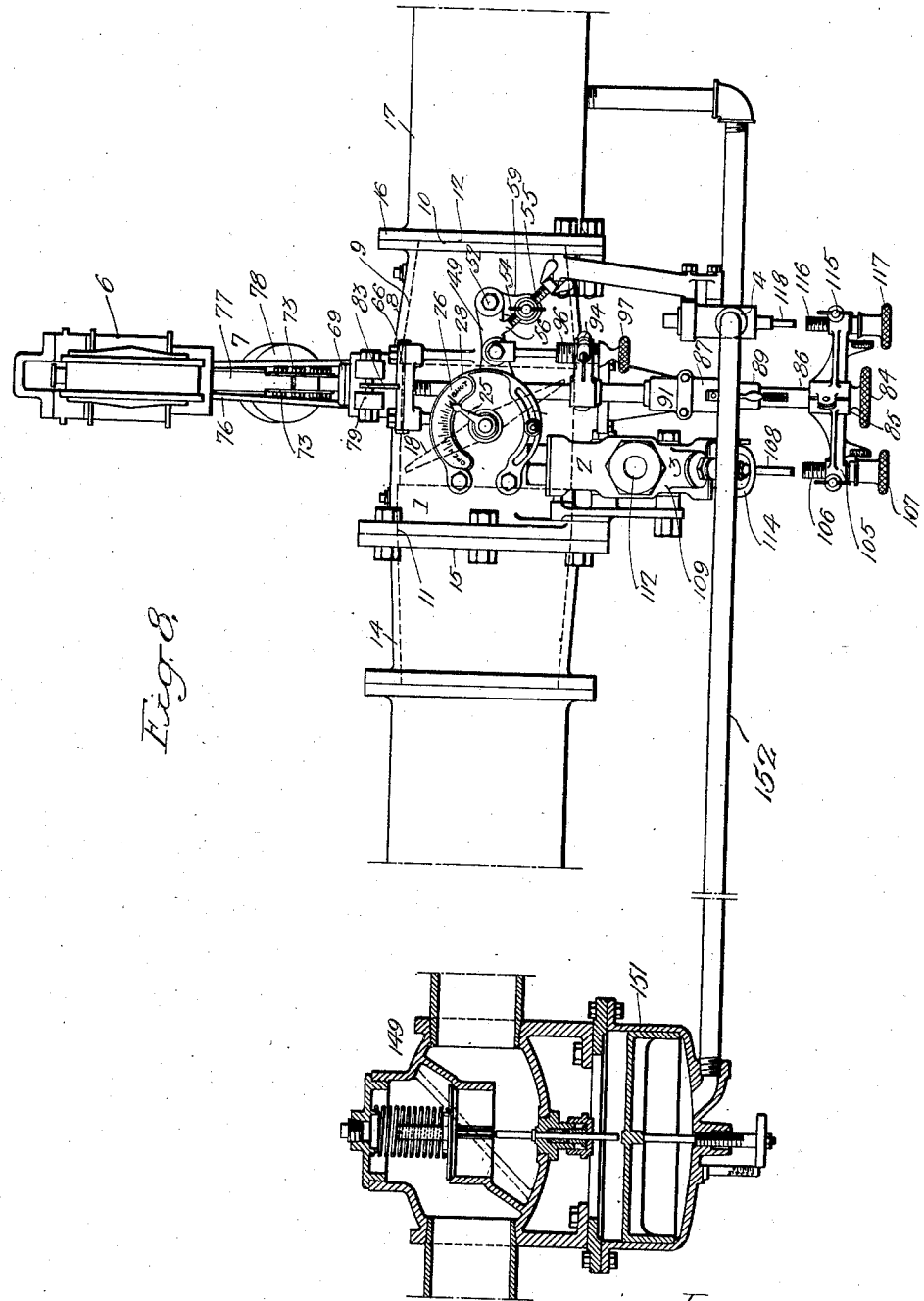

Patented June 10, 1930

1,763,385

UNITED STATES PATENT OFFICE

GEORGE F. BEACH, OF PHILADELPHIA, PENNSYLVANIA, ASSIGNOR, BY MESNE ASSIGNMENTS, TO RYAN, SCULLY & COMPANY, OF PHILADELPHIA, PENNSYLVANIA, A CORPORATION OF DELAWARE

VALVE APPARATUS

Application filed September 8, 1927. Serial No. 218,284.

My invention relates to valves, and it has for one object the provision of a valve group constituting an improvement over that disclosed in my co-pending application, Serial #147,265, filed Nov. 9, 1926 and assigned to F. J. Ryan Company.

Another object of my invention is to provide a triplex valve structure that shall comprise a butterfly valve, a second valve, a pilot valve, and common operating means for the valves having abutments and affording variations in the extent of operation of one or another or all of the valves.

A further object of my invention is to provide a valve structure comprising a butterfly valve adapted to be connected to a source of fluid under pressure, a pilot valve connected to the pressure side of the butterfly valve, and operating means for the valves permitting the adjustment of the pilot valve independently of the butterfly valve.

A still further object of my invention is to provide means that shall be particularly adapted to the maintenance of predetermined operating conditions in a furnace, said means being simple and efficient in operation and further characterized by ruggedness of construction.

With these and other objects and applications in mind, my invention further consists in the details of construction and operation and arrangement, hereinafter described and claimed and illustrated in the accompanying drawings, wherein Fig. 1 is a side elevational view of a triplex valve structure embodying my invention, showing the several adjustable abutments in their normal working positions, with the solenoid deenergized and the butterfly valve partly opened to insure the desired minimum flow therethrough;

Fig. 3 is an enlarged side elevational view of the butterfly valve and associated operating mechanism;

Fig. 4 is a transverse sectional view taken on the line 4—4 of Fig. 3, but showing the valve disk in its fully opened position;

Fig. 5 is a transverse sectional view of the pilot valve, the sectional plane being taken on the line 5—5 of Fig. 1;

Fig. 6 is a similar view taken on the line 6—6 of Fig. 5;

Fig. 7 is a view, partially diagrammatic and partially structural, of the triplex valve unit in connection with a furnace control system; and Fig. 8 is a view of the triplex valve group in connection with a fluid-operated gas valve constituting an alternative application.

Figure 1:
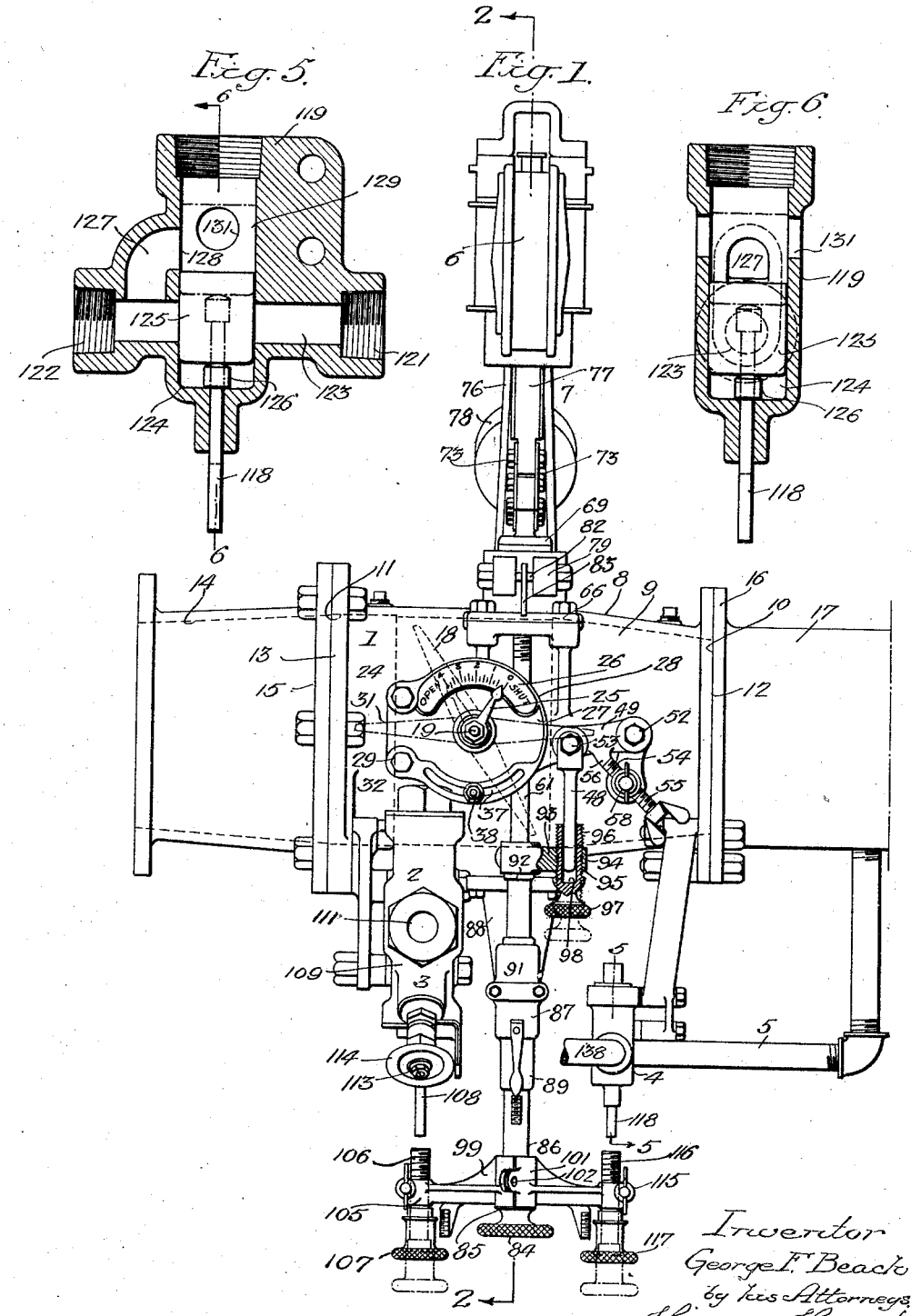

Referring to Fig. 1, the triplex valve structure therein shown comprises in general a butterfly valve 1 for controlling the flow of air from a fan or other source of air under pressure (not shown); a fuel valve 2 having an independent, hand controlled by-pass valve 3; a pilot valve 4 having a connection 5 to the pressure side of the valve 1; a solenoid 6 responsive to the temperature indications in a furnace or the pressure conditions of a boiler (not shown); and an operating mechanism 7 for the butterfly valve 1, the oil valve 2 and the pilot valve 4 responsive to the energization and deenergization of the solenoid 6.

Considering the triplex valve unit in greater detail, the butterfly valve 1 comprises an elongated, main casing 8 defining a passage 9 extending between openings 10 and 11 respectively positioned at oppositely flanged ends 12 and 13. The discharge end 13 may be extended by means of a reducing coupling 14, a flanged end 15 of which is secured by bolts to the adjacent flanged end 13 of the main casing 8. The intake end 12 of the casing 8 may be secured to a flanged end 16 of an air-supply pipe 17 leading to a fan or other source of air under pressure (not shown).

The flow of air through the passage 9 may be controlled by a valve disk 18 having a supporting shaft 19 (Fig. 4). The ends of the shaft 19 are journaled in bearings 21 and 22 which extend from opposite sides of the casing 8, respectively. A front end 23 of the shaft 19, which is extended beyond the bearing 22, is of reduced diameter and it serves to provide a mounting for a mutilated gear-wheel 24 and a pointer 25. The pointer 25 is movable over a scale 26 formed on an outer side 27 of an index plate 28. The scale 26 is so graduated that when the valve disk 18 is in its fully closed position, the pointer 25 is in line with the zero marking of the scale, but when in its open position, shown in dot-and-dash lines in Fig. 1, the pointer 26 is in line with the full scale marking.

The index plate 28 is secured in the position illustrated by bolts 29 extending into a shoulder 31 projecting forwardly from the adjacent front side portion of the casing 8. A resilient force may be exerted on the valve disk 18 tending to hold the same in the closed position shown in Fig. 1 by means of a spiral resetting spring 32, one end 33 of which is rigidly secured in a recessed portion 34 of the gear-wheel 24. An opposite end 35 is secured in a member 36 adjustably positioned in an arcuate slot 37 formed in the index plate 28. A nut 38 mounted on a threaded outer end 39 of the member 36 serves to clamp rigidly said member 36 in a desired adjusted position. Thus, variations in the tension of the resetting spring 32 may be obtained merely by moving the adjustable abutment 36 from one desired position to another in the arcuate slot 37.

The action of the spiral spring 32, in preventing over-travel of the valve disk 18 beyond its fully open position may be supplemented by a spring 41 preferably of U-shape. One arm 42 of the spring 41 is bent backwardly around an upper edge 43 of the shoulder 31, and it is secured to a side 44 thereof by screws 45. The other arm of the spring 41 is curved backwardly, as shown in Fig. 3, to provide an abutment 46 which is so positioned as to engage a toothed portion 47 of the gear-wheel 24 when the valve disk 18 approaches its fully opened position. Continued movement of the valve disk 18 with the portion 47 abutting against the spring 41 causes the latter to be bent backwardly, thereby exerting a retarding force which increases to a value sufficient to prevent a movement of the valve disk 18 beyond its fully opened position. When the force thus operating to open the butterfly valve 1 is removed, as will presently appear in greater detail, the valve disk 18 is caused to move in the reverse direction under the combined forces of the resetting spring 32 and the stop spring 41.

The opening movement of the valve disk 18 just described may be effected by the operating mechanism 7 through a valve stem 48 and gear-wheel mechanism 49, of which the gear-wheel 24 is one element. The other element of the gear-wheel mechanism 49 is a gear-wheel 51 which has been shown in the form of a segment. The gear-wheel segment 51 may be mounted on a stud 52 extending forwardly from the front side of the main casing 8. The segment 51 affords a pivotal mounting 53 to an upper end of the valve stem 48.

In order that sufficient air may be supplied to the furnace to maintain proper combustion conditions, when, for example, the furnace losses only are to be supplied, I provide an adjustable abutment 54 which is designed to permit variations in the closed or zero position of the valve disk 18. The abutment 54 comprises an adjusting screw 55, one end of which is movable into and out of engagement with a shoulder 56 formed on the underside of the gear-wheel segment 51. The adjusting screw 55 may be mounted in a bearing 57 controlled by a clamping screw 58, the bearing 57 being mounted on an arm 59 extending downwardly from the supporting stud or post 52.

When it is desirable to adjust the zero or closed position of the valve disk 18, the clamping screw 58 is released and the adjusting screw 55 turned in a direction causing the valve disk 18 to move counter-clockwise. Should the resulting flow of air through the valve 1 be insufficient, further adjustment may be obtained merely by turning the screw 55. It is particularly noted that this adjustment is effected independently of the solenoid operated mechanism 7.

The solenoid operated mechanism 7 comprises a vertically positioned lift rod 61 (Fig. 2), a threaded upper end 62 of which adjustably engages a cylindrical nut 63 which is movable vertically in a bearing 64 provided by a cylindrical bracket member 65. The bracket member 65 has laterally extending flanges 66 at its lower end which are bolted or otherwise secured to a supporting platform 67 constituting an integral extension from an upper side of the main valve casing 8. An upper end 68 of the lift rod nut 63 is provided with a horizontal flange 69 which engages an upper edge 71 of a bracket member 65 when the nut 63 and the lift rod 61 are in their lower position shown in Fig. 2, whereby the same may be supported. The turning of the vertically movable nut 63 in its bearing may be prevented by a key 72.

The upper end 68 of the nut 63 is connected by a pair of links 73 to a lever 74 having a pivotal mounting 75 on a solenoid frame 76. One end of the lever 74 is connected to a plunger 77 of the solenoid 6, while the other end is provided with a counter-balancing weight 78. The position of the weight 78 on the lever 64 should be adjusted until the weight of the solenoid plunger 77 and connected operated mechanism 7 is just sufficient to cause the flange 69 of the nut 63 to rest entirely on the supporting bracket 65. Thus, substantially the full force of the solenoid 6 may be applied directly to the valves 1, 2 and 4 in the normal operation thereof.

The solenoid 6 may be mounted on an upper end of the frame 76, the lower end of said frame having a spit bearing 79 positioned to engage the outer side of the supporting bracket 65, and it is provided with projecting spaced arms 81 interconnected by a clamping screw 82. A latch 83, which is mounted intermediate the arms 81 on the clamping screw 82, is so positioned as to be movable into engagement with the side of the flange 69 when the operating mechanism 7 is in its raised working position, the load being thus removed from the solenoid 6, the latter may be deenergized and a saving in current effected. It is noted, however, that since the operating mechanism 7 is locked in position, no assurance may be had as to the maintenance of predetermined conditions in the furnace or boiler. Hence, the latch 83 should be used only where automatic operation is unnecessary.

The length of the lift rod 61 or its position relative to the valve stem 48 may be adjusted by a hand-wheel 84 (Fig. 2) which is mounted on the lower end thereof. The hand-wheel 84 is provided with a supporting shoulder 85 having a sleeve 86 that extends vertically around the lift rod 61 and is movable bodily therewith. The sleeve 86 of the lift rod 61 may be guided during their vertical movement incident to the operation of the solenoid 6 and the sleeve 86 also prevented from turning by means of a vertical bearing 87 which is mounted on a removable bracket arm 88 extending downwardly and forwardly from an underside of the main valve casing 8. A portion 89 of the sleeve 86, which is movable in the bearing 87, is preferably of rectangular cross section and the bearing 87 is correspondingly formed. Access is afforded to the interior of the bearing 87 by a removable cap member 91 constituting a front wall of said bearing.

An upper end of the sleeve 86 is provided with a supporting flange 92 and a cross-arm 93. An outer end 94 of the cross-arm 93 (Fig. 1) is provided with a threaded split bearing 95 for the reception of a vertically adjustable abutment 96 shown as a screw-plug. The plug 96 may be operated by a knob 97, and it is provided with a recess 98 (Fig. 1) for the lower end of the pivoted valve stem 48.

When the adjustable abutment 96 is moved into its dot-and-dash line position shown in Fig. 1, the solenoid plunger 77 may be operated throughout its full stroke without engaging the valve stem 48. However, when the abutment 96 is moved upwardly to decrease the space between the end of the valve stem 48 and the base of the recess 98 into the position shown in solid line in Fig. 1, the upward movement of the solenoid plunger 77 causes the abutment 96 to engage the valve stem 48, thereby imparting a corresponding upward movement thereto. This movement of the valve stem 48 causes the turning of the gear-wheel segment 51 about its mounting 52, resulting in a counter-clockwise movement of the gear-wheel 24 and, consequently, the operation of the valve disk 18. This opening movement of the valve disk 18 continues against the force of the spring 32 until the valve disk 18 reaches its fully opened position, over-travel beyond this position being prevented by the resilient abutment afforded by the spring 41.

When the solenoid 6 is deenergized, the plunger 77 and the operating mechanism 7 drop by reason of their own weight against the force of the counterweight 78, the parts coming to rest when the flange 69 of the nut 68 engages the supporting bracket 65. With the dropping of the operating mechanism 7, the valve disk 19 returns to the original position determined by the adjustable abutment 54. It is noted that the extent of operation of the valve disk 19 may be controlled not only by the adjustable abutment 96 but also independently by the lift rod 61, the latter adjustment being effected by the turning of the hand-wheel 84 and connected lift rod 61. Moreover, the zero setting of the valve disk 18 may be adjusted by the abutment 64 independently of either the adjustable abutment 96 or the lift rod 61.

Figure 2:
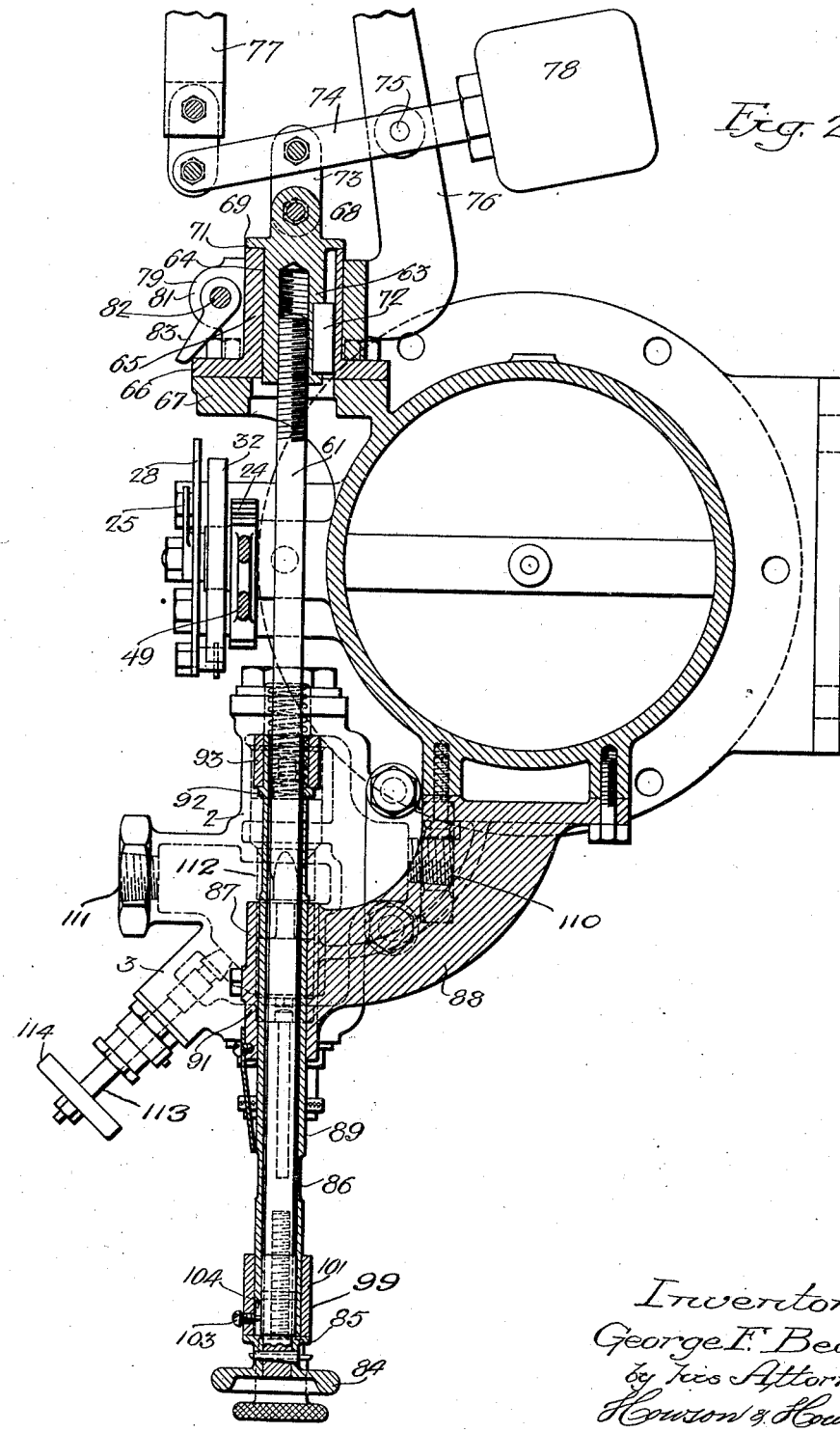
Fig. 2 is a transverse sectional view taken on the line 2—2 of Fig. 1.

Referring to Figs. 1 and 2, a cross member 99 is provided with a split bearing 101, which is supported on the flange 85 of the hand-wheel 84 and it may be clamped in this position in engagement with the lift rod sleeve 86 by means of a clamping screw 102. A set screw 103, (Fig. 2) which extends into a slot 104 formed in an adjacent portion of the sleeve 86, serves to prevent a turning movement of the cross member 99 about the lift rod 61.

One end of the cross member 99 terminates in a split bearing 105 adapted to receive an adjustable abutment 106 illustrated as a screw-plug corresponding to the abutment 96. The lower end of the abutment 106 is provided with an operating handle 107, while an upper end is designed to abut against a valve stem 108 of the fuel valve 2. In Fig. 1, the abutment 106 is shown in dot-and-dash lines in its lowered position, wherein it is spaced from the valve stem 108 regardless of the energization or deenergization of the solenoid 6. The normal position of the abutment 106 is illustrated in Fig. 1 in solid lines.

The oil or fuel valve 2 comprises a casing 109 having inlet and outlet openings 110 and 111 (Fig. 2), respectively. Intermediate these openings is positioned a main balanced-valve portion 112 and a valve disk for the by-pass valve 3. The by-pass valve is mounted on a spindle 113 carrying an external operating handle 114. The balanced valve portion 112 is normally maintained in its closed position, interrupting the flow of fuel through the passage extending between the openings 110 and 111, but it may be opened by means of the actuating spindle 108 which is positioned in the path of travel of the abutment 106. The position of the abutment 106 thus controls the extent of operation of the balanced valve portion 112 of the fuel valve 2, while the by-pass valve 3 may be independently adjusted by means of the hand-wheel 114. A further detail description of the fuel valve 2 and its associated by-pass valve 3 is contained in my co-pending application noted above.

In accordance with my invention, the other end of the cross arm 99 is provided with a split bearing 115 for the reception of an adjustable abutment 116 which is shown as a screw-plug, as in the case of the abutment 106. The lower end of the abutment 116 is provided with an operating handle 117, while an upper end is positioned in operative relation to a valve stem 118 of the pilot valve 4.

The pilot valve 4, of which Figs. 5 and 6 are vertical, sectional views, comprises a casing 119 having a main air inlet opening 121, which is connected to the pressure side of the butterfly valve 1 by means of the pipe 5, and an outlet opening 122. A horizontal passage 123 is thus formed between these openings, which is interrupted by a vertical boring 124 for a piston 125. The piston 125 is of such dimensions that in its solid line position shown in Fig. 5, it serves to disconnect the outlet opening 122 from the inlet opening 121. It is noted that in its lowered position, the piston 125 rests on a head 126 of the valve stem 118.

The portion of the passage 123 between the piston 125 and the outlet openings 122 is provided with a by-pass 127 having an opening 128 into a portion 129 of the vertical boring 124 immediately above the piston 125. The portion 129 is normally in communication with the outside through an aperture 131. The openings 128 and 131 are so positioned, however, that they are closed when the piston 125 is moved into its dot-and-dash line position shown in Fig. 5. Such vertical movement of the piston 125, however, causes the completion of the passage 123, permitting fluid entering the passage 123 through the opening 121 to pass therefrom through the outlet opening 122. The extent of operation of the piston 125 is controlled by the relative spacing of the valve stem 118 and the abutment 116, the latter, in its dot-and-dash line position in Fig. 1, failing to cause the operation of the pilot valve 4 regardless of the energization of the solenoid 6. The normal position of the abutment 116, however, is illustrated in solid line in Fig. 1.

Assuming the apparatus in the normal position shown in solid line in Fig. 1, wherein the adjustable abutments 96, 106 and 116 are in desired spaced relation to the valve stems 48, 108 and 118, respectively, the energization of the solenoid 6 causes an upward movement of the lift rod 61 and the substantially simultaneous engagement of the abutments 96, 106 and 116. During the subsequent upward movement of the solenoid plunger 77, the butterfly valve disk 18 is actuated into its open position shown in dot-and-dash line in Fig. 1 against the force of the resetting spring 41 and, at the same time, the stem 108 actuates the main valve portion 112 into its open position, causing the opening of the fuel valve 2. During this opening movement of the valves 1 and 2, the pilot valve 4 is also being opened, inasmuch as the abutment 16 actuates the piston 125 from its solid line position shown in Fig. 5 into its dotted line position, permitting the interconnection of the respective end portions of the passage 126 and the flow of air therethrough from the pressure side of the butterfly valve 1. The open positions of the butterfly valve 1, the fuel valve 2 and the pilot valve 4 just described are maintained so long as the solenoid 6 is energized. However, when the solenoid 6 is deenergized due to a change in the required volume of fuel and air, as will appear hereinafter in greater detail, the operating mechanism 7 drops under its own weight, permitting the disengagement of the valve stems 48, 108 and 118 and the consequent return of the valve disk 18, the valve portion 2 and the piston 125 to their original positions.

When it is necessary, for example to compensate for the losses of the furnace, the by-pass valve 3 is adjusted to permit a desired minimum flow of fuel and the adjustable abutment 54 is actuated to move the valve disk 18 from its fully closed position to a position wherein a desired flow of air may be continuously maintained therethrough, as, for instance, that shown in Fig. 1. It is noted that these adjustments are effected independently of the abutments 96, 106 and 116 and the rod 61. The rod 61 also permits the simultaneous adjustment of the abutments 96, 106 and 116 should it be desirable to vary equally the extent of operation of the butterfly valve 1, the fuel valve 2 and the pilot valve 4.

One application of the valve group just described is illustrated in Fig. 7 which shows broadly a furnace 132, temperature responsive means 133 designed to cause the energization and deenergization of the solenoid 6 in accordance with predetermined conditions in the furnace 132; the valve group above-described; a fuel burner 134; a stack valve 135 for controlling the draft of the furnace 132 and its operating air motor 136 and connecting means 137 extending between the fuel valve 134 and the butterfly and fuel valves 1 and 2, respectively. As will presently appear, these parts are so related as to cause automatically the maintenance of predetermined temperature conditions in the furnace 132,—the stack valve 135 being closed to reduce the furnace draft simultaneously with the decrease in the supply of fuel and air to the burner 134 when the temperature exceeds the desired value, and vice-versa when the temperature falls below said value.

As shown in Fig. 7, the discharge opening 122 of the pilot valve 4 is connected by a pipe 138 to the air motor 136. The motor 136 is provided with a vertically movable piston 139. The piston 139 is connected by linkage 141 to the stack valve 135. The linkage 141 is provided with a counterweighted lever 142 tending to hold the stack valve 135 in its normally closed position. Adjustments in the closed position of the stack valve 135 may be effected by means of a threaded stem 143 which extends through the walls of the air motor 136 into engagement with the piston 139 thereof. So long as the parts are in the position shown in Figs. 1 and 7, the supply of air to the motor 136 is prevented by the piston 125 of the pilot valve 4 and the supply pipe 138 is connected to atmosphere through the by-pass passage 127 and the aperture 131.

Air is supplied to the burner 134 through a pipe 137 which is connected to the discharge side of the butterfly valve 1. A pipe 145 serves to supply oil or other fuel passing from the valves 2 and 3 to the burner 134 as above noted, so long as the valve group is in the position shown in Fig. 1 only fuel and air are supplied to the valve 134 sufficient to maintain the furnace losses. The supply of air is due to the adjustment of the butterfly valve disk 18 from its closed position by means of the abutment 54, while oil is supplied by reason of the opening of the by-pass valve 3.

The electrical connecting means 133 extending between the furnace 132 and the solenoid 6 may comprise a temperature responsive instrument 146, control apparatus 147 which is responsive to the instrument 146, and a solenoid operating circuit 148 which is controlled by apparatus 147. The details of these instruments constituting no part of my present invention, so that a further description is believed to be unnecessary.

Assuming the apparatus 133 so adjusted that currents are supplied to the solenoid 6 by reason of a drop in the temperature of the furnace 132, the operation of the mechanism 7 of the triplex valve group results in the opening of the butterfly valve 1, the fuel valve 2 and the pilot valve 4. Since the pilot valve 4 is connected to the pressure side of the butterfly valve 1, air under pressure is supplied to the fluid motor 136, resulting in the actuation of the stack valve 145 into its open position. The opening of the butterfly valve 1 and the fuel valve 2 causes increased amounts of fuel and air to be supplied to the burner 134, so that the temperature of the furnace 132 is very quickly increased to the predetermined value.

Should the increase in temperature exceed the desired maximum value, then by reason of the operation of the electrical means 133, the solenoid 6 is deenergized, thereby permitting the operating mechanism 7 to drop and the valves 1, 2 and 4 to close. The closing of the valve 4 causes the air supply pipe 138 to be connected to atmosphere through the aperture 131 in the pilot valve 4. Air therefore, is exhausted from the motor 136 and the damper valve 135 is then closed under the action of the counterweighted lever 142. The simultaneous closing of the butterfly valve 1 and the valve 2 results in a supply of oil and air to the burner 134 only sufficient to permit the furnace losses to be compensated. When the furnace temperature again drops below the desired value, the foregoing cycle is repeated.

The valve group shown in Fig. 1 lends itself to a still further application, such, for example, as that shown in Fig. 8, wherein a gas valve 149 is shown of such dimensions as to prevent its operation directly by the solenoid 6 and associated operating mechanism 7. Accordingly, an air motor 151 is provided, the piston of which is sufficiently large so that operation of the valve 149 is assured when subjected to air having a pressure corresponding to that passing through the butterfly valve 1. The air motor 151 may correspond to the air motor 136 shown in Fig. 7, and it is connected by a main supply pipe 152 to the discharge outlet 122 of the pilot valve 4. The further operation of these parts is as described in connection with Fig. 7.

While I have described my invention in detail, and while I have pointed out certain of the most obvious principles and purposes thereof, I do not intend that the language employed in the following claims shall be limited to the precise features described, but I intend that the claims shall be construed to cover all combinations which are fairly included in the language thereof, when read in connection with the prior art, regardless of the details and functions mentioned in the description or illustrated in the drawing.

I claim:

1. A triplex valve structure comprising an air valve, a fuel valve having an adjustable by-pass valve therefor, a pilot valve, electrically operated mechanism for actuating said air, fuel and pilot valves, and means whereby the extent of operation of said pilot valve may be adjusted independently of the other valves.

2. In a triplex valve unit comprising a valve having a controlling disk, means for adjusting the closed position of said disk, a fuel valve having a by-pass valve therefor, a pilot valve, a solenoid and common operating mechanism for said disk, said fuel valve and said pilot valve responsive to said solenoid.

3. A triplex valve group comprising a valve having a control disk, a second valve provided with by-pass means, a third pilot valve, a solenoid, mechanism responsive to said solenoid for operating said valves, means whereby one or another or all of said valves may be adjusted, and means for adjusting the closed position of said control disk independently of said last-mentioned means.

4. A triplex valve unit comprising a butterfly valve, a second valve having by-pass means, a third pilot valve, a solenoid, and mechanism responsive to said solenoid for operating said valves, said mechanism including a lift rod and a cross arm carried by said rod, said cross arm being provided with adjustable abutments, whereby the extent of operation of said pilot valve may be independently adjusted.

5. A valve group comprising a butterfly valve, a pilot valve connected to the pressure side of said butterfly valve, a solenoid, and mechanism responsive to said solenoid for substantially simultaneously operating said valves, said mechanism including independently adjustable abutments permitting variations in the extent of operation of said valves.

GEORGE F. BEACH.